(12) United States Patent
English et al.

(10) Patent No.: US 9,275,150 B2
(45) Date of Patent: Mar. 1, 2016

(54) SYSTEM AND METHOD FOR SEARCH AND DISPLAY OF CONTENT IN THE FORM OF AUDIO, VIDEO OR AUDIO-VIDEO

(71) Applicants: Tanya Ward English, Longmont, CO (US); Eric Haya, El Dorado Hills, CA (US); Reilly Sweetland, Los Gatos, CA (US)

(72) Inventors: Tanya Ward English, Longmont, CO (US); Eric Haya, El Dorado Hills, CA (US); Reilly Sweetland, Los Gatos, CA (US)

( * ) Notice: Subject to any disclaimer, the term of this patent is extended or adjusted under 35 U.S.C. 154(b) by 0 days.

(21) Appl. No.: 14/295,996

(22) Filed: Jun. 4, 2014

(65) Prior Publication Data

US 2014/0289226 A1    Sep. 25, 2014

Related U.S. Application Data

(63) Continuation of application No. 12/876,026, filed on Sep. 3, 2010, now Pat. No. 8,782,066.

(51) Int. Cl.
*G06F 17/30* (2006.01)

(52) U.S. Cl.
CPC ...... *G06F 17/30864* (2013.01); *G06F 17/3005* (2013.01); *G06F 17/30746* (2013.01); *Y10S 707/913* (2013.01)

(58) Field of Classification Search
CPC ............ G06F 17/30746; G06F 17/271; G06F 17/274; G06F 17/2775; G06F 17/2785; G06F 17/3002; G06F 17/30873; G06F 17/30616; G06F 17/30622; G06F 17/30675; G06F 17/30864
USPC .................................. 707/705, 716, 722, 758
See application file for complete search history.

(56) References Cited

U.S. PATENT DOCUMENTS

| | | | | |
|---|---|---|---|---|
| 7,437,351 | B2 * | 10/2008 | Page | ............................. 707/705 |
| 2005/0108001 | A1 * | 5/2005 | Aarskog | ............... G06F 17/271 704/10 |
| 2007/0118399 | A1 * | 5/2007 | Avinash | ................ G06F 19/322 705/2 |
| 2007/0130112 | A1 * | 6/2007 | Lin | ..................... G06F 17/3002 707/716 |
| 2008/0094654 | A1 * | 4/2008 | Troyansky et al. | .......... 358/1.14 |
| 2009/0177301 | A1 * | 7/2009 | Hayes | ............................. 700/94 |
| 2010/0008500 | A1 * | 1/2010 | Lisanke et al. | ................ 380/201 |
| 2012/0265744 | A1 * | 10/2012 | Berkowitz | ........ G06F 17/30873 707/705 |

\* cited by examiner

*Primary Examiner* — Shahid Alam
(74) *Attorney, Agent, or Firm* — Marc D. Foodman

(57) ABSTRACT

The invention relates to the field of computer search on a network and is particularly directed to searching for and displaying content in the form of audio, video and/or audio-video ("A-V") results wherein the content that results from the search includes a textual transcript associated with the content. A system and method provide seamless delivery of audio, video and A-V results that are auto-populated into a media player on a computer system.

16 Claims, 15 Drawing Sheets

SYSTEM AND METHOD FOR SEARCH AND DISPLAY OF CONTENT IN THE FORM OF AUDIO, VIDEO OR AUDIO-VIDEO

RELATED UNITED STATES APPLICATION DATA

This application is a continuation-in-part of U.S. patent application Ser. No. 12/876,026 entitled "A System and Method for Search and Display of Audio-Video Content," filed on Sep. 3, 2010, which claims priority benefit from U.S. Provisional Application No. 61/240,081, filed on Sep. 4, 2009.

BACKGROUND

It is an everyday occurrence for most of us to use an internet search tool on a computer or other electronic device connected to a network to find any conceivable information that is of interest to us. As more and more information is posted on the internet, as well as on private networks, the need to efficiently search and access that information has grown exponentially. Search has become a huge business dominated by Google, Inc. of Mountain View, Calif. In response to a search string or query input by a user, a search engine such as Google's considers a host of factors before it delivers a prioritized list of results. Other companies offering similar search services to users hungry for information include Microsoft, Yahoo, and IAC among others.

The most successful search engines use keywords typed in by the user to comb through millions of web pages in search of relevant information that the search engine algorithms are programmed to return. For text-based web pages, this type of searching has proven enormously successful. As bandwidth for internet users has expanded, web pages have become far more sophisticated and dynamic, now hosting many different formats such as audio, video and/or A-V recordings that can be played by a user through their internet connection. For purposes of this specification, the terms audio, video, A-V, media and multimedia are all files containing content of the different types that may be streamed live or played back from a recording. It should be further understood that any of these different types of content lend themselves to storage and play back in different file formats which will be discussed throughout the specification. It should be understood that the use of "audio," "video," "A-V," "media" or "multimedia" individually or together throughout this specification is intended to cover any one or more of these content types in one or more formats where appropriate.

As these different types of media have proliferated across the web and become standard on internet web pages, the search engines have failed to keep up in terms of the ability to search the content of non-text-based formats such as audio, video and A-V recordings. While text-based pages are predominantly in one of a few formats such as XML, HTML, DOC, or PDF that allow strings of characters to be identified and compared, searching the content of an audio, video or A-V recording is far more challenging.

Of the media players available on the market today, none allow for a simple, seamless searching and synchronized playing of a selected segment of audio, video and/or A-V content directly from the popular search engines.

However, once the audio track of recorded material that contains speech, sounds or visual cues is converted to text, that text is searchable by search engines available in the market today. It is worth noting that the actual search results produced by a search engine analyzing a transcribed audio, video or A-V track is only as accurate as the speech-to-text, sound-to-text or visual-to-text transcription that is performed.

While text based search engines are widely available for network use, audio, video and/or A-V search tools are not. An example of a limited capability search tool for video is the experimental video search "gadget" (formerly the "Gaudi gadget") provided by Google of Mountain View, Calif. On Google's web pages dedicated to political videos, a user may search the videos on a limited set of web pages by entering a search term in the search query box. The results from the limited set of web pages are listed and can be selected by a user to be taken to the beginning of the video that contains that term.

There are various companies offering software that uses algorithms to automatically produce transcripts from audio, which are then synchronized with video containing the audio. One such product is MetaPlayer produced by RAMP, Inc. of Woburn, Mass. (formerly Everyzing, Inc. of Cambridge, Mass.) Companies like RAMP offer search within an individual video by searching for a text string matching text in the transcription. When a search string is entered for a particular video, results are listed. When a result is selected, the video is played from that occurrence of the searched string.

The present invention recognizes the desirability of producing advanced search capabilities for audio-only and/or audio-video content, as well as the use of those same capabilities enhanced with accurate transcription and synchronization.

BRIEF DESCRIPTION OF THE DRAWINGS

FIG. 1d is an internet screen shot of a web page to which a user is taken after clicking on a highlighted search result in FIG. 1c;

FIG. 2a is an internet screen shot of a YouTube web page;

FIG. 2c is an internet screen shot of a search result page returned by the YouTube search engine in response to the search string entered in FIG. 2b;

FIG. 3c is an internet screen shot of a media player where the selected search result highlighted in FIG. 3a has been selected and automatically passed through to the search box in the media player and where audio-video content is queued to an occurrence of the search string, in accordance with the present invention;

DETAILED DESCRIPTION

Figure 1A:
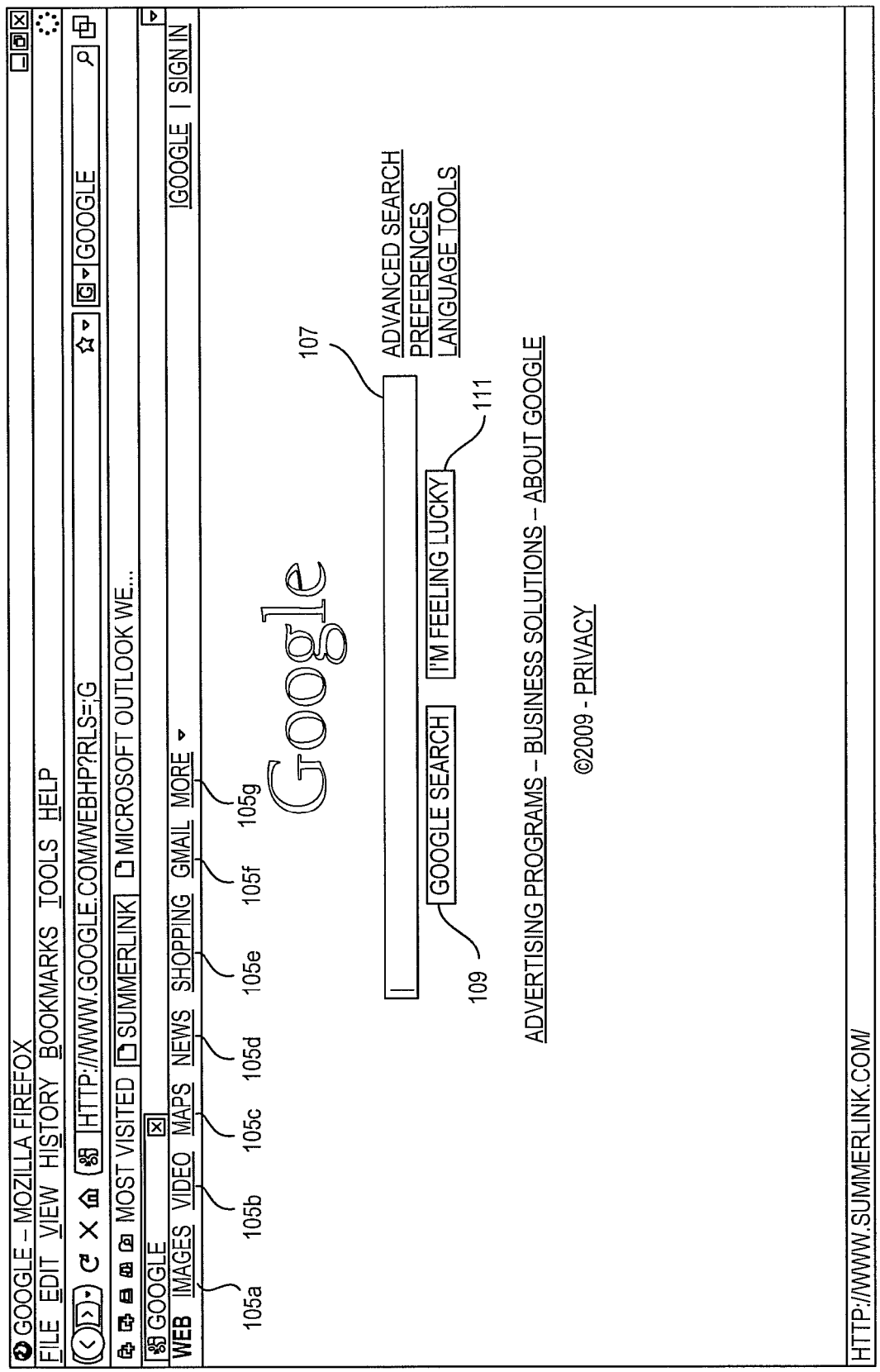
FIG. 1a is an internet screen shot of a search page.

Searching the internet or any other network for information using a computer or another electronic device is performed using any of a number of available search tools. As any person familiar with the internet knows, it is a simple exercise to enter a query either by typing it in on a keyboard, entering it by a voice command, or otherwise inputting it to the system through a user interface, and within a second or less have a list of results, descriptions or "hits" with links to web pages that are related to the key words typed into the user query. The user can click any hit to drill down into the search results and determine whether any particular hit is of interest. Searching in this manner can assist a user in an infinite number of ways in finding information related to products to purchase, product prices, news clips, sports scores, biographical information, historical data, stock prices or just about anything else that an individual can imagine or think of.

It should be understood that throughout this description, the term "internet" refers to the world wide web which is a ubiquitous network accessed by users all over the world. It should be understood that other networks whether public or private may utilize the invention. Therefore, any use of the term "internet" should be considered synonymous with the term "network." Further, throughout this description, the term "computer" refers to an electronic device capable of connecting to a network and which now has, or will in the future have capabilities for conducting search on the network to which it is connected, among other functionalities. For purposes of this description, the term "computer" should be considered synonymous with any electronic or computing device with capabilities for conducting search on a network, including but not limited to a(n): (a) desktop computer, (b) laptop computer, (c) server, (d) tablet or netbook computer, (e) mobile device such as a smartphone, (f) a wearable device such as a smartwatch, (g) computing device integrated into another device such as eyeglasses, an automobile, (h) a smart TV, (i) a game console such as an Xbox®, a Playstation® or a Wii®, (j) electronic music player, electronic reader, camera or other dedicated device with network connectivity, or (k) a portable game player such as a PSP® or a GameBoy®. On any of these devices, it should be understood that a search query may be entered using a keyed input, a voice command, or any other method of data entry. For purposes of this description, use of the term "type" shall be synonymous with "enter" and shall include any data entry whether by typing, voice command or any other method for inputting a search query. In addition, a "computer" or "computing device" shall be understood to be connectable to a network, and actions performed on the computer or computing device may include local actions conducted on the device itself or activities conducted across the network to which it is connected, including but not limited to environments such as server-based computing, cloud computing, cloud-based computing, virtualization and the use of virtual servers, any of which may be running applications interfacing with the computer or computing device, before, during and after search activities. It will be understood that the computing device may operate in any of these environments using the invention.

An example of a search page is shown in FIG. 1a. FIG. 1a is a screen shot 101 of a search page provided by Google, Inc. of Mountain View, Calif. Search page 101 contains a number of other elements such as links 105 in the upper left corner for taking the user to other applications offered by Google. These applications are Images 105a, Video 105b, Maps 105c, News 105d, Shopping 105e, Gmail 105f and more 105g that will list other links if selected. A user may enter their query into a query box 107 and then click on Google Search box 109, I'm Feeling Lucky box 111 or simply press the enter key on the keyboard (see FIG. 6) to start the search. The screenshot of FIG. 1a is shown using the Firefox browser offered by Mozilla of Mountain View, Calif. It should be understood that a user can use another browser or search engine such as Internet Explorer or Bing offered by Microsoft Corporation of Redmond, Wash. or any other browser enabling a user to access and search web pages on the internet.

Figure 1B:
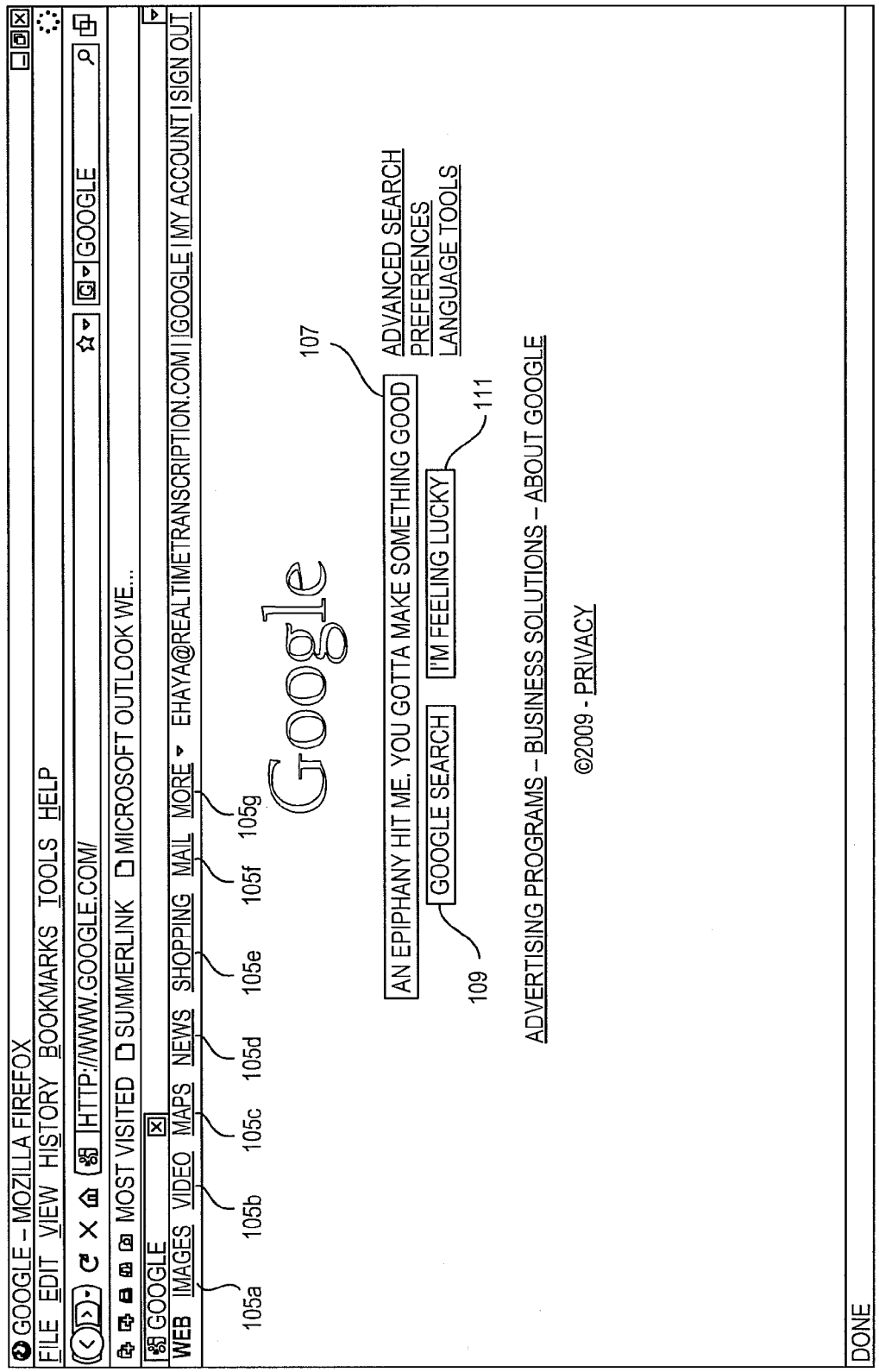
FIG. 1b is an internet screen shot of a search page including a search string input by a user into a query box.

FIG. 1b shows the search page of FIG. 1a where the query or search string "An epiphany hit me. You gotta make something good" has been typed into the query box 107. Once the search string is entered, the search tool performs a search across the internet employing algorithms programmed to return search results that are deemed most relevant to the entered string. Some search tools are better at delivering relevant results than others, and different search tools may deliver different results on the same string. Users may find a favorite search tool and stick with it exclusively or may employ multiple search tools in their quest to find the most pertinent information.

Search queries of different types are well known, including searches with different types of filtering for targeting improved search results. A search may include one or more words, or it may be structured with a grouping of words in a particular order. For example, many search engines recognize a set of words or other textual symbols surrounded by quotes to mean that the user is searching for the exact search string as input. In some cases, the search engine includes algorithms that consider the query and may suggest other options, such as, for example, where the user has input a word in the string that is misspelled or otherwise not recognized. Other search engines have specific query formats that the user must follow. These may include using instructions within the search string or identifying a particular type of database to be searched. An example of an instruction set for performing searches using Google's search engine may be found at:

https://support.google.com/websearch/answer/142143?hl=en

Further, search engines allow filtering or refinement either before or after a set of results have been returned to the user. For example, a user may require that the search be limited to images or maps, or that the results be limited to retail establishments offering goods or services for sale. Using these different search tools, a user may limit the results delivered to achieve a better search experience. It should be understood that the present invention may incorporate any and all of these search techniques.

Figure 1C:
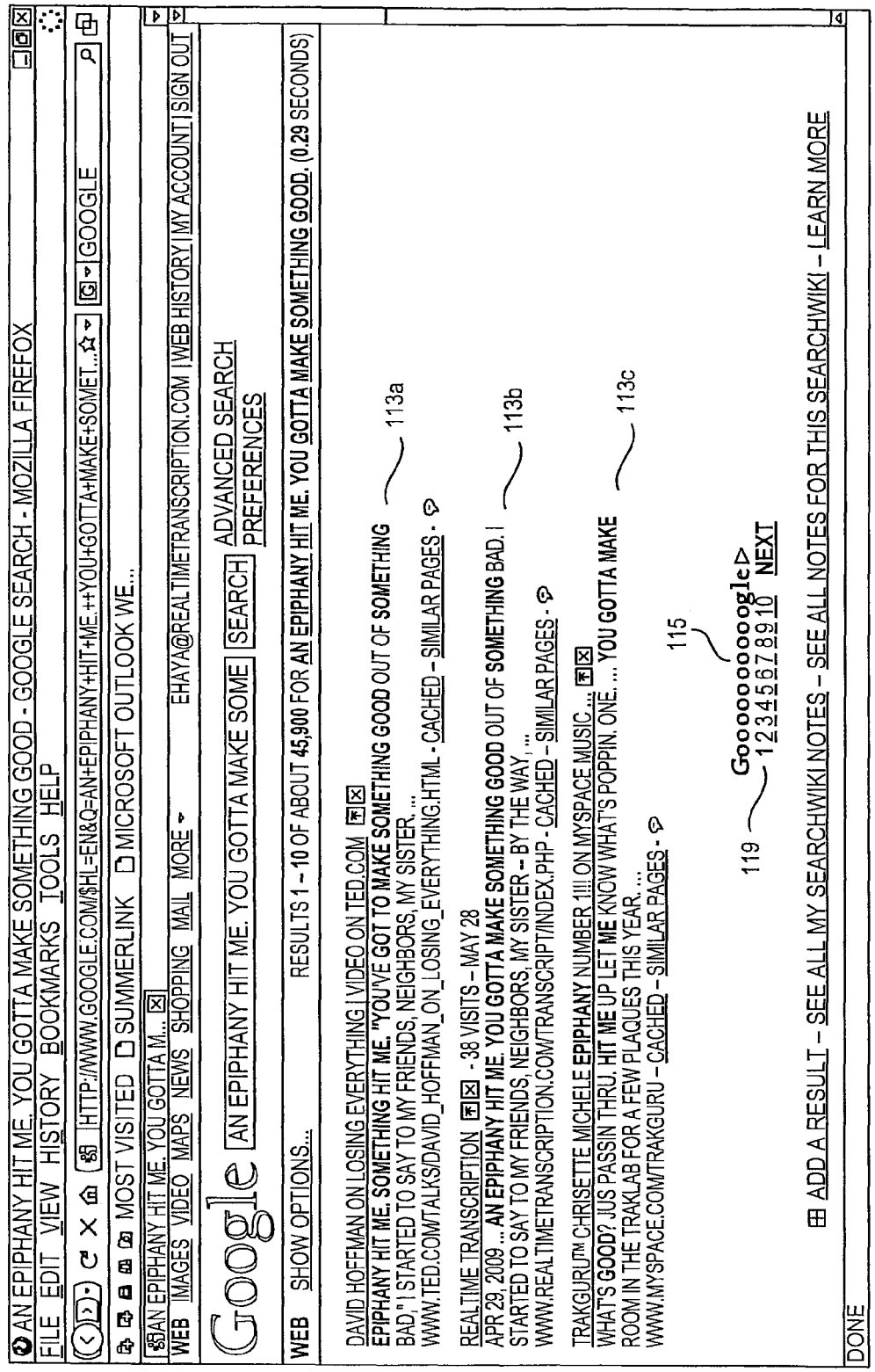
FIG. 1c is an internet screen shot of a search result page returned by a search engine in response to the search string entered in FIG. 1b.

FIG. 1c shows the results 113a-c of a traditional internet search delivered by the Google search tool for the string "An epiphany hit me. You gotta make something good" entered into query box 107. As mentioned above, the user can click on any of the returned results or "hits." Each hit is hyperlinked to the web page containing the searched-for information and allows the user to be taken to that page by simply clicking on the hit. Additional hits are available to the user by clicking on the "O"s 115 or numbers under the O's 119 at the bottom of FIG. 1c.

Figure 1D:
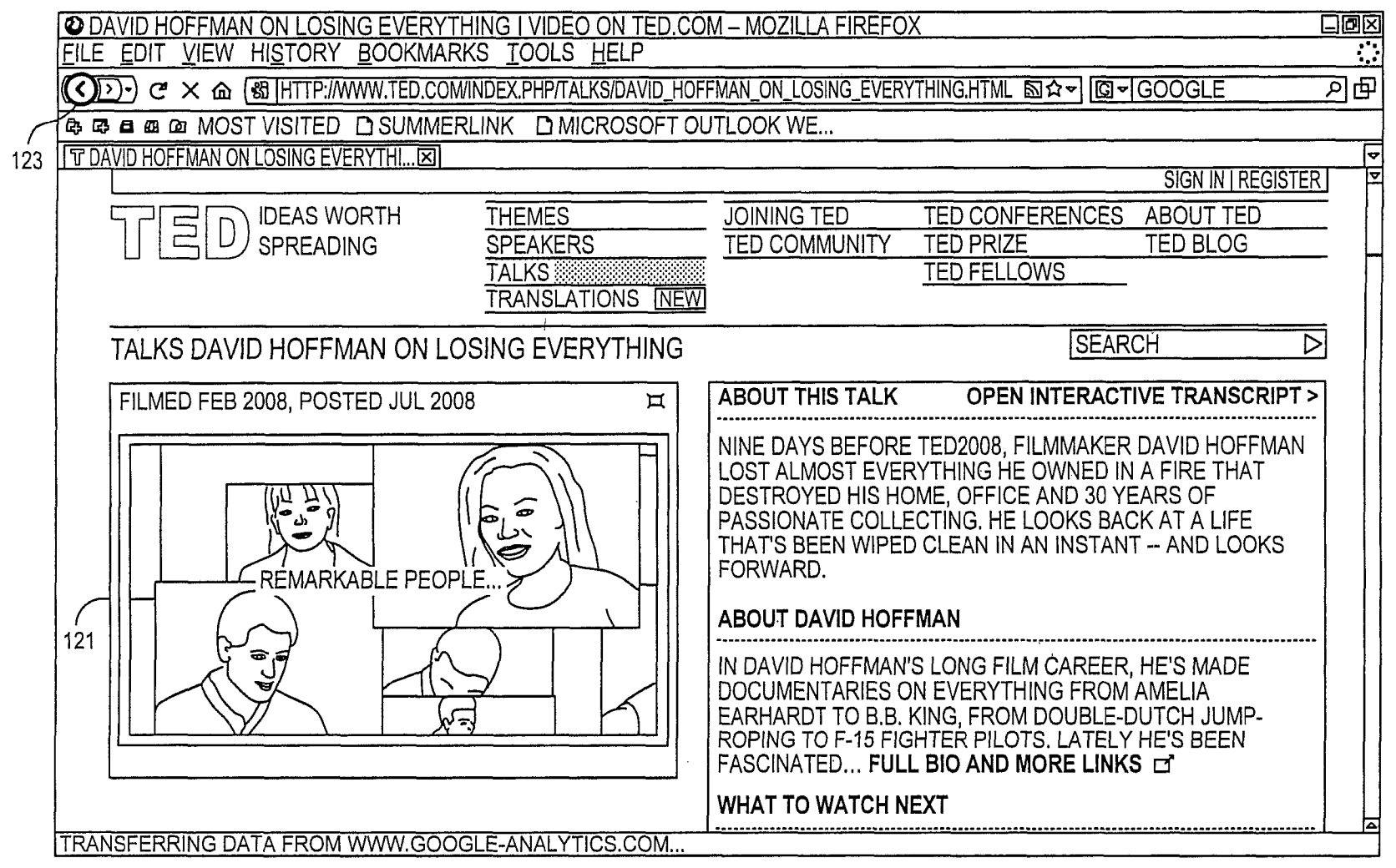

FIG. 1*d* shows a resulting web page from the website TED.com, after the user clicks on the highlighted result 113*a* in the listed search results. The information displayed on the TED web page 121 is presumably something of interest to the user based on the search string they entered into the query box 107. If not, the user may simply hit the "back" button 123 on the browser window and go back to search results 113. Once back at the search result page FIG. 1*c*, the user may select a different result from the list of search results 113 and pull up the corresponding web page to determine whether that web page contains information of interest.

This process may be repeated numerous times until the user gathers the information that they are looking for. To date, this process has become the standard for searching the internet for information. One area of interest that is largely omitted from the search results is audio, video and/or A-V content. The reason for this is that the search engines available to users today search the web pages of the internet by comparing a text-based search string entered in query box 107 (FIG. 1*a*) to the text that appears in different formats on the web pages. The typical formats that are searchable include extensible markup language ("XML"), hypertext markup language ("HTML"), portable document format ("PDF"), word documents ("DOC" and "DOCX") and a number of others that are recognized and regularly used by web programmers.

A problem that exists is that the standard search engines are not equipped to search anything other than text-based strings. In the past few years, as user bandwidth has increased, there has been an explosion of audio, video and A-V content made available to internet users on web pages. Anyone with a media player accessible through their computer can easily access audio content such as songs, speeches, audio books, movies, or any other sound-based content as well as any audio that is included with video content, either in recorded or live form. Some of the most popular web pages on the internet such as the website YouTube (owned by Google, Inc.) are dedicated entirely to A-V content and allow users to access A-V content uploaded by other users.

Figure 2A:
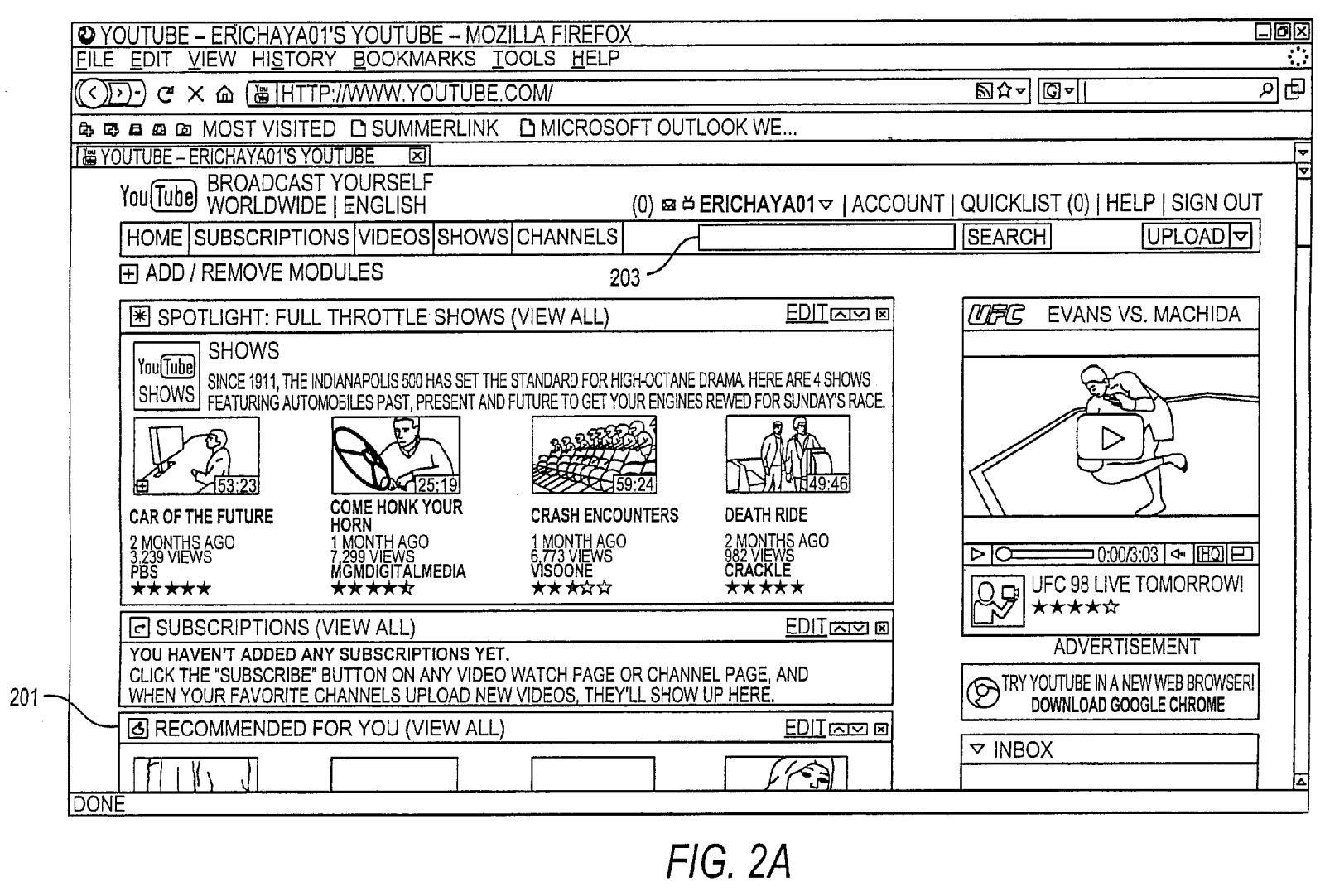
Figure 2B:
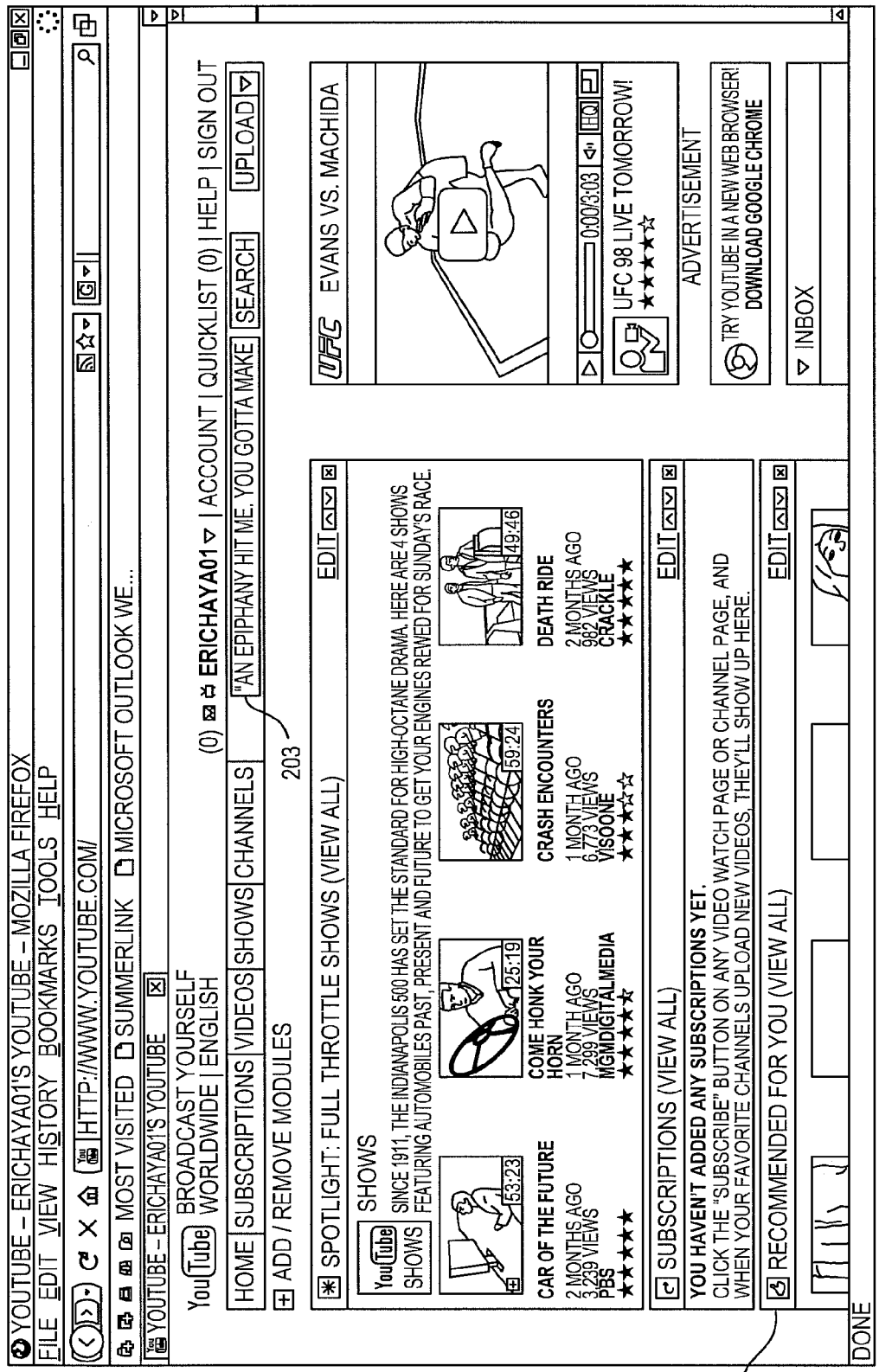
FIG. 2b is an internet screen shot of the YouTube web page including a search string input by a user.

FIG. 2*a* is an internet screen shot of a YouTube web page 201. To search the content media files on YouTube to find those of most interest to a user, the user types a text-based string into a query box 203. This process is very similar to the process described for a standard search using the Google search page in FIGS. 1*a*-1*d*. FIG. 2*b* shows YouTube web page 201 with the search string "An Epiphany hit me. You gotta make something good" entered in query box 203. To find the most relevant A-V content, YouTube employs a search algorithm that is based on a text-based description of the media file input by the person who uploaded it to the YouTube web site. The text-based description of the video input for user-uploaded video is typically limited to a user-designated title and may also include a short description of the content.

Figure 2C:
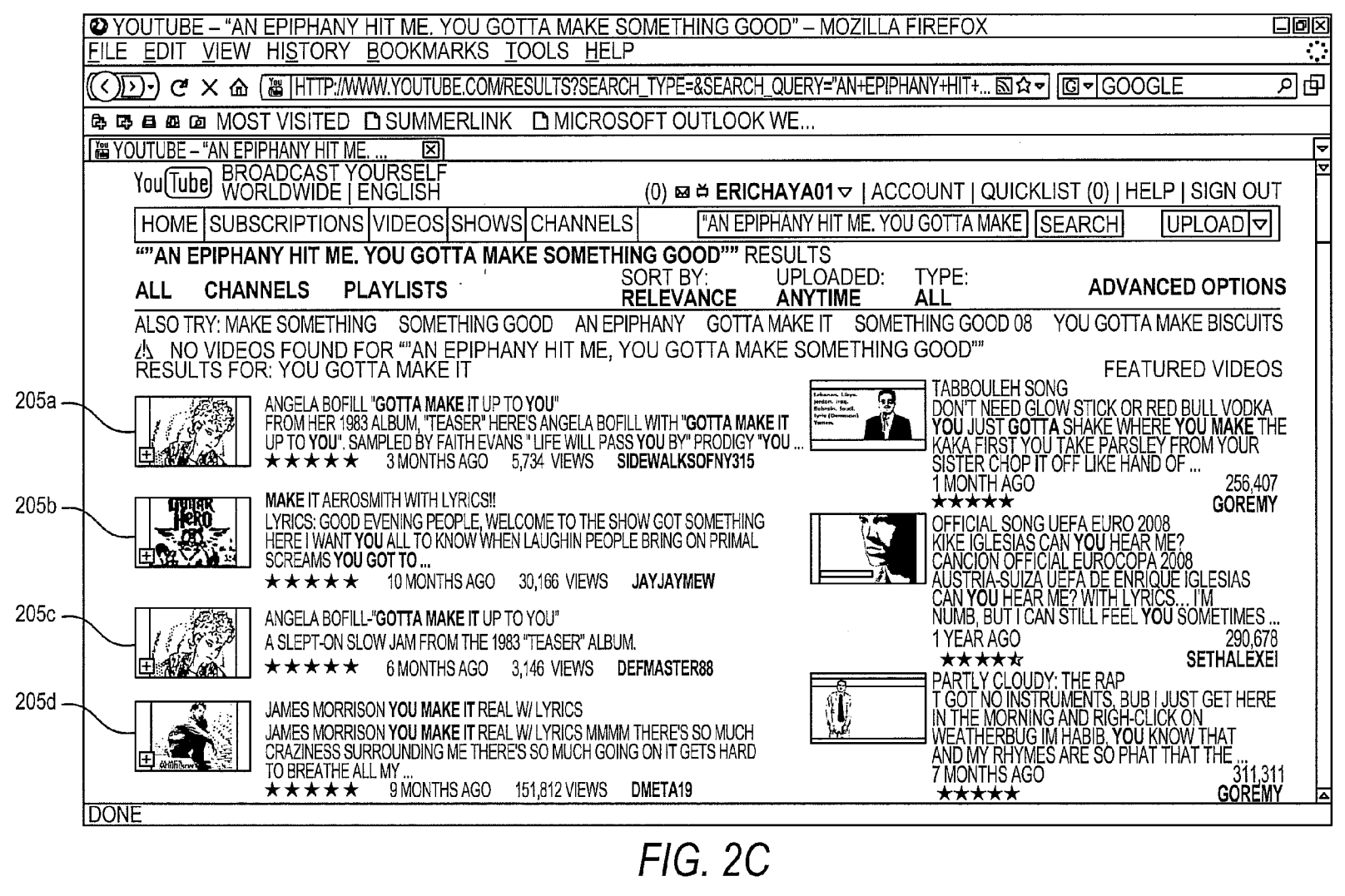

FIG. 2*c* shows an example of results 205*a-d* returned to the user based on the query entered. There is no capability to search the actual audio track of the recordings available on YouTube to find and display the specific words embedded in the recording itself. But the YouTube search engine will deliver results that it determines are closest to the input query based on a text based title or description associated with the recordings. Once the results are returned, as with the Google search of FIG. 1*a* through FIG. 1*d*, YouTube permits a user to click on any of the hits 205*a-d* to be linked to the page corresponding to the selected hit. As an example, if a user clicks on hit 205*a* for Angela Bofill "Gotta Make it Up To You," the user is taken to web page 207 (FIG. 2*d*), allowing the user to access the video file identified in search result 205*a*. Once a user accesses web page 207, the user can play the selected recording from its starting point using a media player (such as a flash based media player for example produced by Adobe Systems, Incorporated of San Jose, Calif.) loaded on their computer (or residing on an accessible network like the internet) represented on web page 207 as display window 211, and having controls 209.

Controls 209 include a play button 209*a* that allows the user to play the video file by clicking on it. Once the video is playing, play button 209*a* becomes a pause button (not shown), allowing the user to pause the video at any time while it is playing. In pause mode, the pause button toggles back to being play button 209*a*. A progress bar 209*b* shows the relative elapsed portion of the video that has been played and is represented by a dot 209*b*1 that advances along progress bar 209*b* until the video is complete, at which time dot 209*b*1 will reach the far right side of progress bar 209*b*. Also within progress bar 209 is a timer 209*c* showing both the elapsed time from the beginning of the video and the time remaining until the video is complete. Other buttons to control the video include a volume control 209*d*, a high-quality switch 209*e*, a full screen switch 209*f* that allows a user to watch the video on the full screen rather than inside the smaller framed display window 211 within YouTube web page 207, and a closed captioning/annotations button 209*g* for activating and de-activating those functions.

Figure 2D:
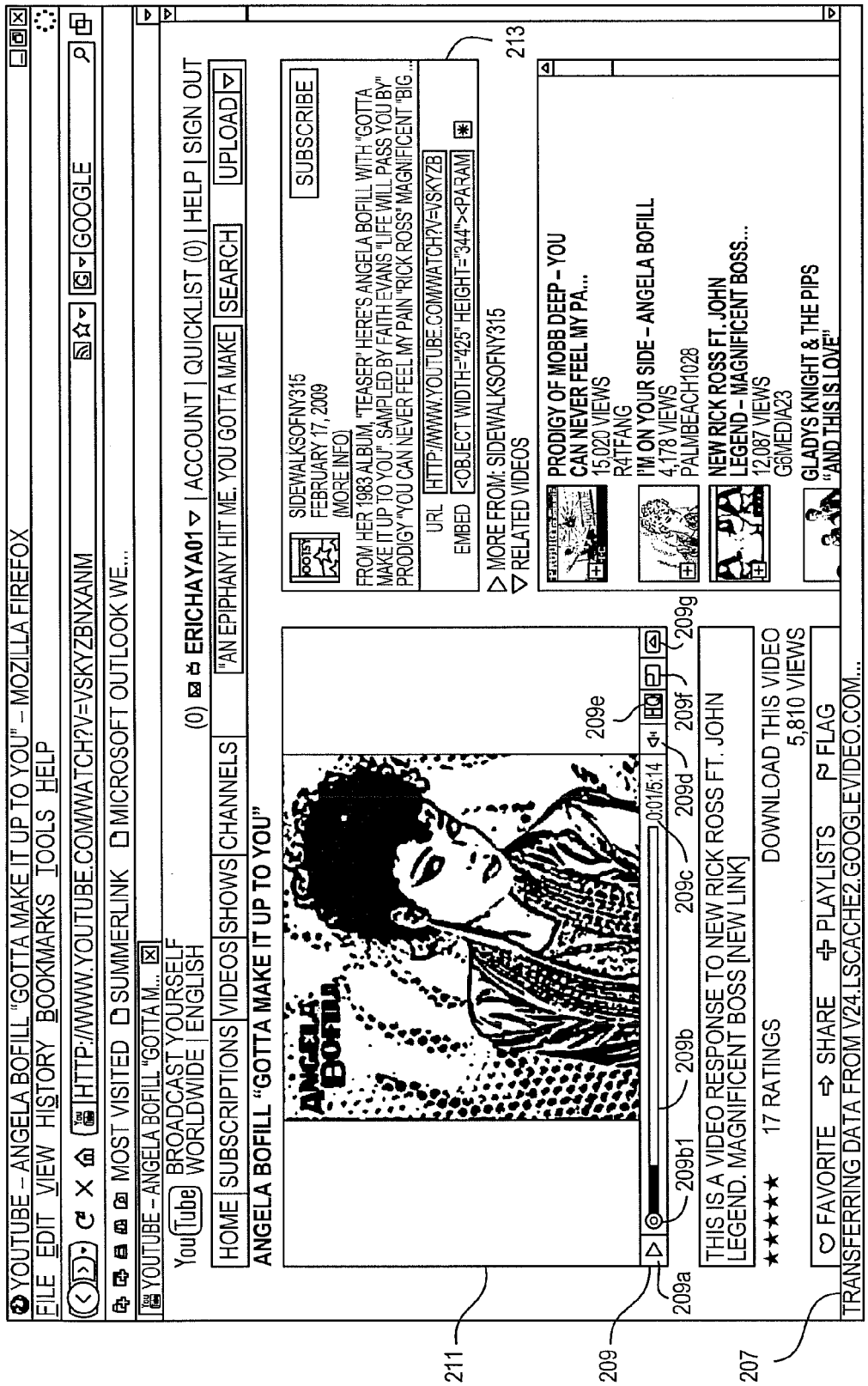
FIG. 2d is an internet screen shot of a web page to which a user is taken after clicking on the highlighted search result in FIG. 2c.

The video itself is shown in display window 211, and advertising 213 is typically shown on the right side of web page 207. The flash-based video player of FIG. 2*d* is one example of such a player. There are many flash-based video players available and other such players may have a different appearance while offering similar functionality to play video in different formats with or without a corresponding audio track.

It should be noted that the search tools and other applications described in this disclosure for use on a desktop computer also apply to any other device, such as a laptop computer, a netbook, a mobile smartphone, online televisions systems or any other device having network access and a web-browser with video capabilities available to the user.

The invention recognizes that a user searching the internet is just as likely to be seeking audio, video or A-V content as they are to be searching for standard text-based content, given that audio content, video content and A-V content are an alternative form of providing information to text in XML, HTML or other formats typically used to display information on a web page.

The advanced search capabilities of the present invention provide for user search on the internet or across any other network, cloud computing environment, or electronic storage medium where audio-only, non-verbal video (e.g. sign language signaling in a video or the display of visual signs or text in a video) and/or A-V media content resides and can be returned along with standard text results. The invention may also be used with American Sign Language ("ASL") or other non-spoken signals. While the invention uses transcription of the words spoken in an audio track in most instances, the invention can be adapted to search for text representing any number of other visual or audio indicators embedded with the searchable content in a text-based form, including but not limited to: (a) non-spoken language, in the case of ASL or other forms of sign language; (b) foreign language subtitles, which represent spoken language, but not in the same language as the audio track; (c) sound effects, which appear in parentheses or brackets in transcription and captioning for persons who are deaf or hard of hearing; (d) video description for persons who are blind, which is a secondary audio track in which a "narrator" describes what is happening visually on the video; (e) description of visual events or signage present on the video, such as the identity of a person speaking (the name of a famous person speaking could be added by facial recognition software, for example, and then become a searchable term), the image of a famous landmark, description of an event such as a flood or a bomb exploding, or description of an object appearing in the video.

The invention also works with supplemental text added to the transcript for ease of navigation of the video, such as "chapter markers," to indicate a new topic or chapter in the video, "agenda items," and/or "glossary terms." Supplemental text such as glossaries or agendas presented at meetings, lectures, business presentations or in other settings may be provided using a hyper-link and may be searched by extension of a particular document. For example, where a user searches for a text sequence that appears in a title of the agenda or glossary, such as "introduction" or "follow-up," they may be taken to the exact place in the video or audio file where that text appears.

Glossary terms can be generated automatically (or manually) when a video is posted to a web page, for example, by software that culls the words appearing in the transcript and gives them a "rating." Those terms are often suggested as meta tags, and those tags can be searchable by adding time codes to indicate each occurrence of the word in the video. As a further example, if a video mentions the term "dysplasia" twenty times and the term "encephalitis" fifteen times, those words are obviously important "glossary terms" that can be searchable. This could tie into a particular page or paragraph about the search string and an indicator such as an increase in font size or highlighting can be used to emphasize the importance of those terms.

Another way to use glossary terms is to cross reference synonymous terms to enhance the search and provide more valuable search results. For example, the search could access unique vocabularies or dictionaries that may be used in a particular area of technology, or in a specific industry. As an example, searching on the word "smack" could also return results for "heroin" and vice versa. An example of such a dictionary is the urban dictionary which is found at:

http://www.urbandictionary.com/
define.php?term=smack.

Figure 3A:
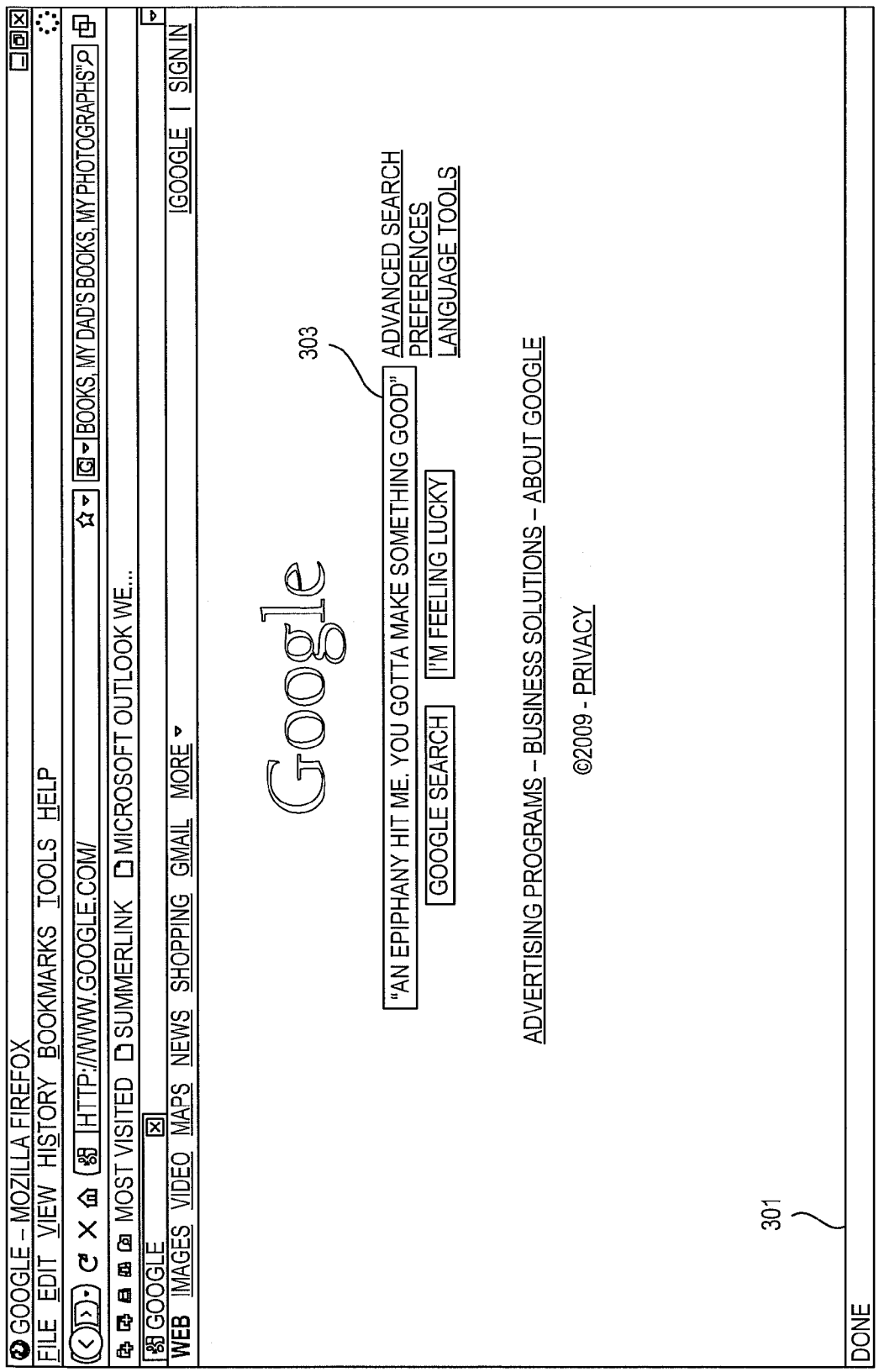
FIG. 3a is an internet screen shot of a search engine web page including a search string input by a user intended to narrow results returned by putting quotation marks around the search string, in accordance with the present invention.
Figure 3B:
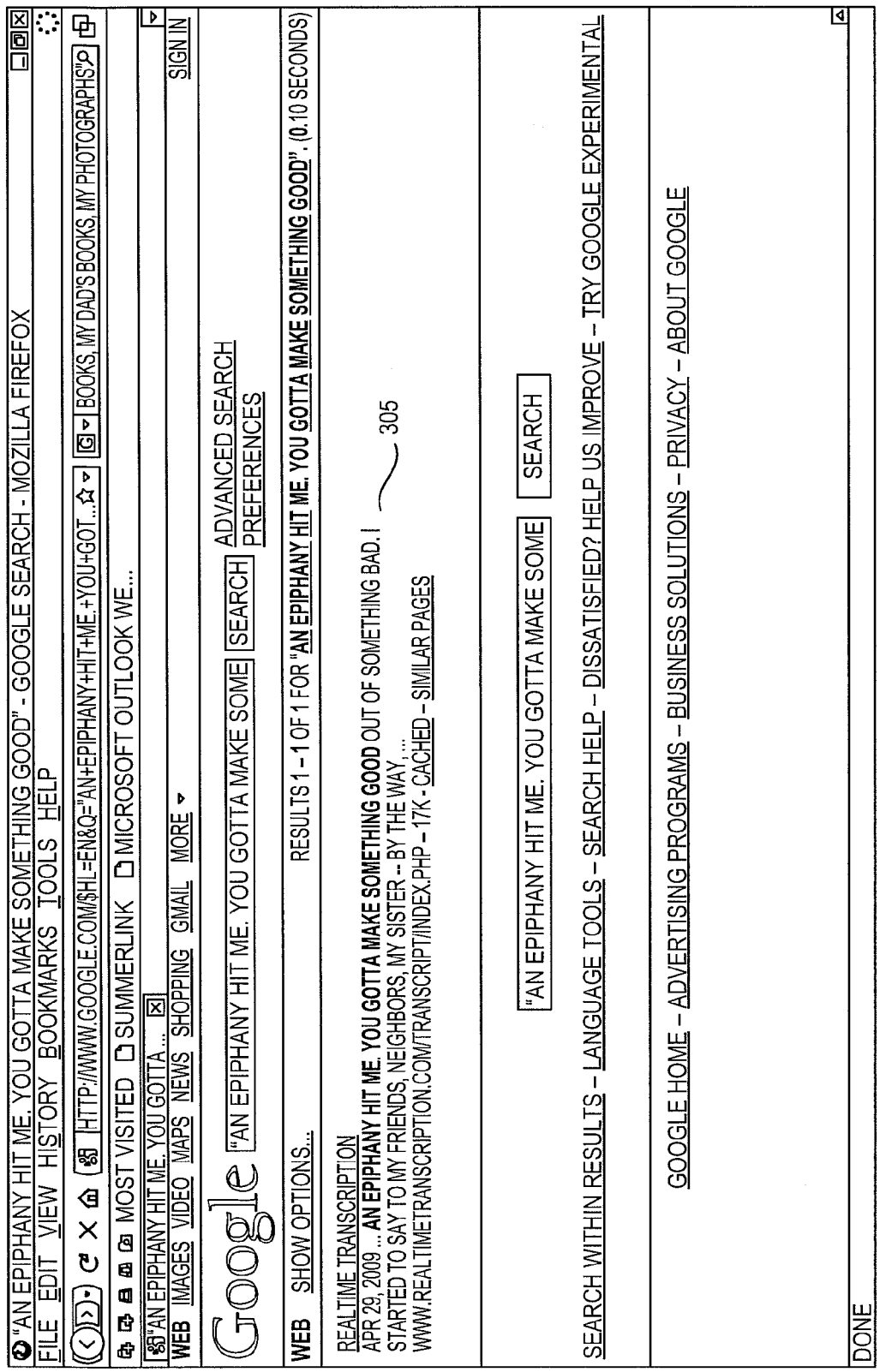
FIG. 3b is an internet screen shot of a search result page returned by a search engine in response to the search string entered in FIG. 3a, in accordance with the present invention.

FIG. 3a shows an internet screen shot of a search tool that is the same as that shown in FIG. 1a with a search string "An epiphany hit me. You gotta make something good" entered in query box 303. FIG. 3b shows the search results 305 including not just text-based search results but also any audio-only, video-only and combined A-V content that match the search string. When an audio-only, video-only or A-V result 305 is selected by the user from the list, the search string is passed automatically from search box 303 in the search tool to a search box 313 in media player 309 of the invention shown in FIG. 3c allowing media player 309 to be queued for play of audio-only, video-only and/or A-V content at the first occurrence in the content of the original search string. The audio-only, video-only or A-V content is also synchronized to the time-coded corresponding text in a transcription display window 321.

Figure 3C:
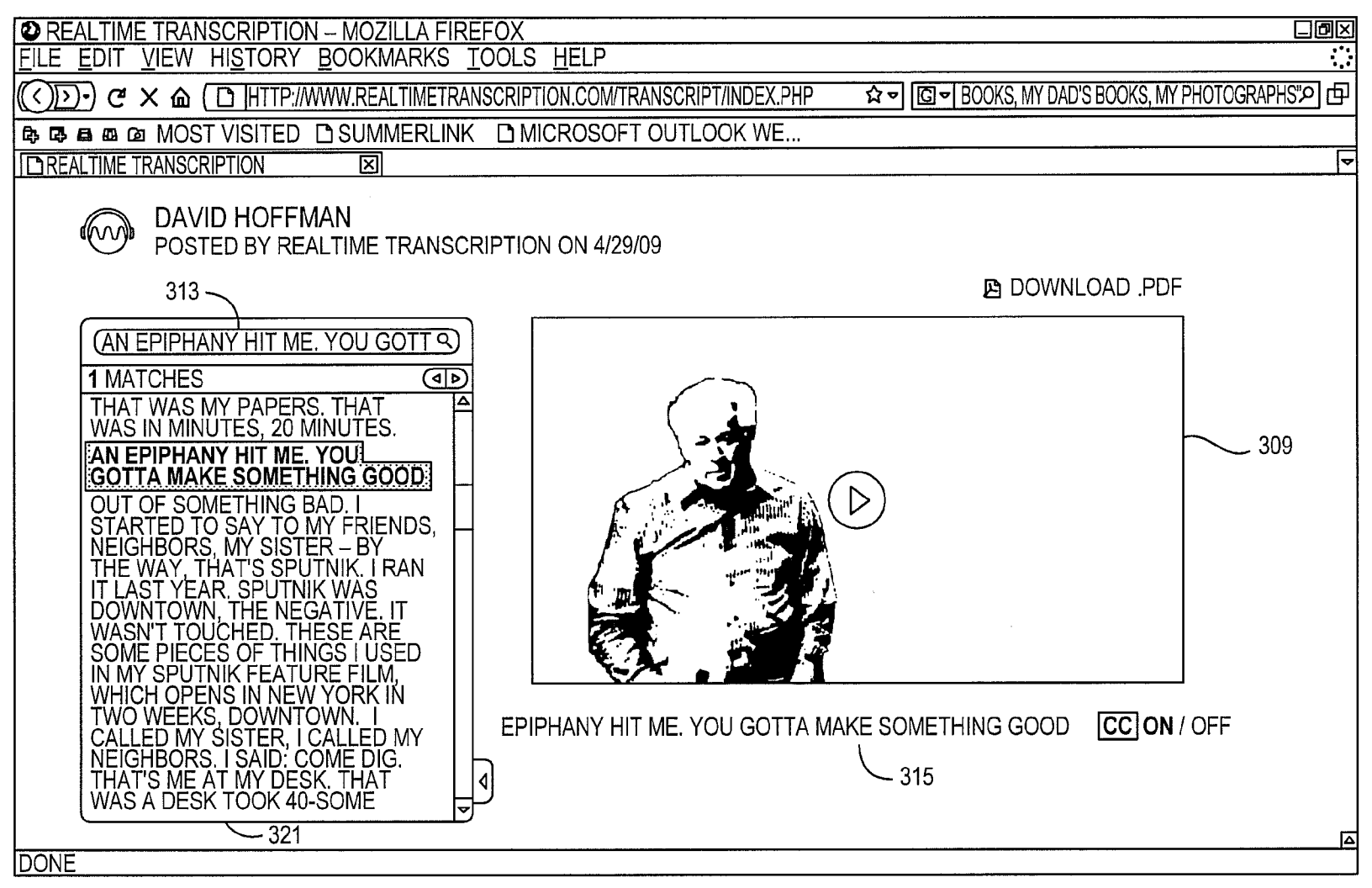
Figure 3D:
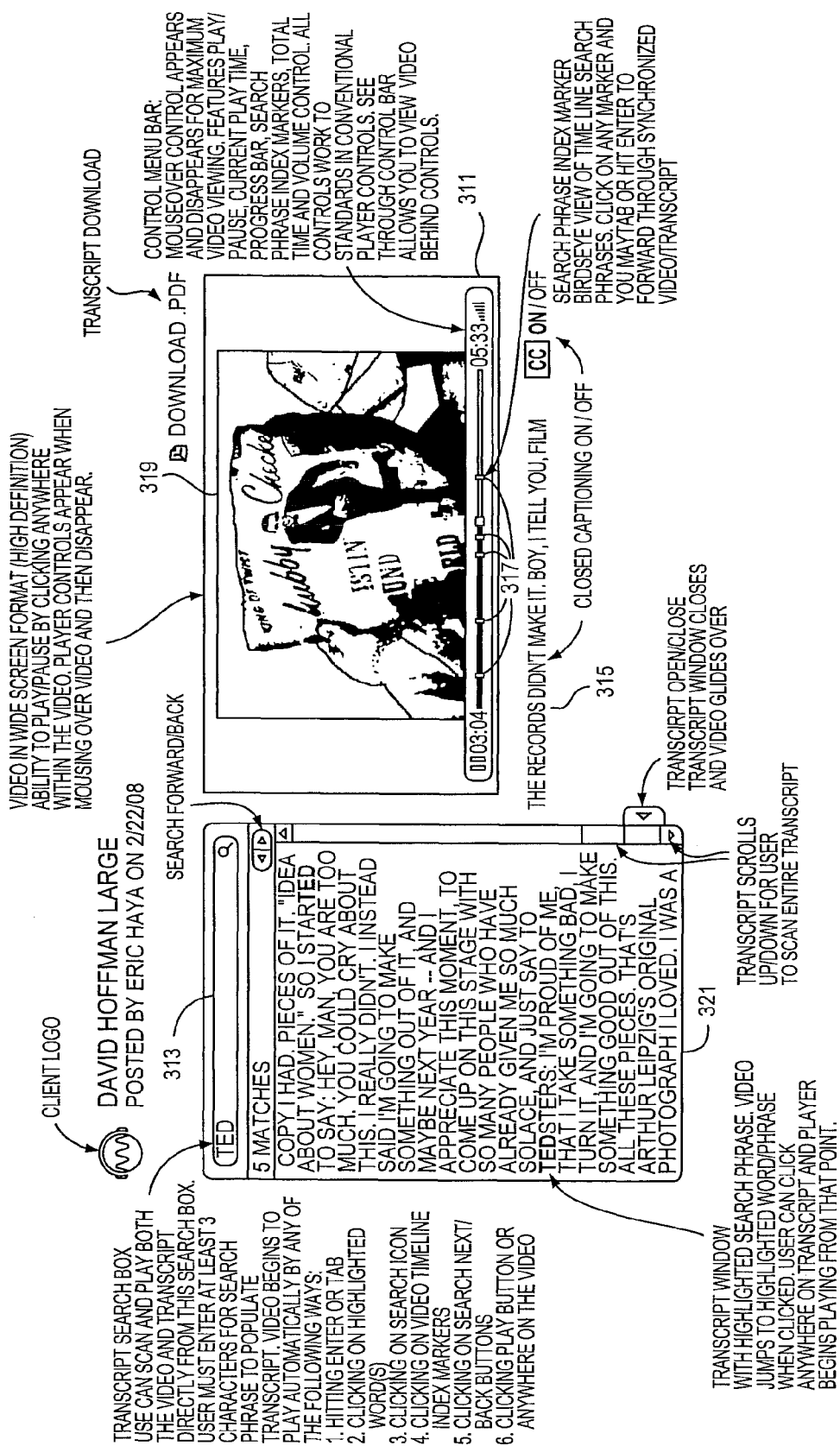
FIG. 3d is an internet screen shot of a help screen for a sample media player of the present invention, which explains the features and how to operate the player.

FIG. 3d shows a "help screen" for a sample media player 311 of the type described with respect to FIG. 3c with descriptions for the different parts of media player 311. Sample media player 311 is in the form of a software application that allows a user to accurately search a word or phrase using a standard search tool 301 such as Google or Bing. Once the results for a search string are selected, the media content is auto-populated to be viewed in various ways: First, the search string in text form is shown in search box 313 and indicated by highlighting, italicizing, bolding or in any other manner along with the rest of the text-based transcript in transcription display window 321; second, the search string in text form along with the rest of the text-based transcript is shown in captioning bar 315; third, a time line of the media content is shown with one or more search string index markers 317 indicating the points along the time line the search string occurs in the content. The corresponding video content is shown in display window 319 as the audio content is played and the text is shown in transcription display window 321.

The present invention allows a user to go beyond standard text-based search and search audio content either alone or in sync with video content to find the specific occurrences of words within the audio, video or audio-video content. This is accomplished by providing a transcription of the audio content, embedding it with the searchable content, and making it available to be searched using a standard text-based search field. When a user types a query into search box 313 of media player 309, the matches are displayed in a number of ways. The text matches appear highlighted in transcription display window 321, and the corresponding audio, video or audio-video is displayed synced to that search string text result. The user plays the corresponding audio or video from that point in the file by pressing the ENTER key on the computer keyboard (see FIG. 6) or using the mouse to click on the PLAY button or anywhere on media window 309 or through an alternate input such as a voice command. The user then has the ability to jump to the next occurrence of that same search string within the content. This can be accomplished in any number of ways. As an example, the user may press the RIGHT ARROW button or ENTER key on the keyboard, or provide a voice command. The corresponding audio, video or A-V is synchronized, so it also advances instantly. In addition, if the user reads ahead or back in transcript display window 321 and would like to listen to another portion of the transcript, the user simply clicks on that text in the transcription display window 321, and the content file displayed in media window 309 automatically plays from that location.

Data mining of multimedia content is achieved by the invention, which generates accurate search engine optimization ("SEO") and social media optimization ("SMO") as a benefit to the web site content providers and owners making the content available on their web page(s). Examples of social media sites are Twitter, Facebook, LinkedIn, MySpace, etc. The steps for performing SEO and SMO are shown in the Flowchart of Player Process referenced in and further explained in FIG. 4 and FIG. 5.

It should be noted that there are numerous methods of transcription (including realtime transcription, realtime captioning and automatic speech-to-text transcription) and numerous ways of generating time codes that can be used to synchronize text and audio or video (such as realtime transcription, realtime captioning, extraction of closed captions, and hand synchronization) that would be recognized by those of ordinary skill in the art in the field of transcription. The invention recognizes and accommodates these various methods.

It should be noted that there are numerous formats of audio and video files produced and in widespread use today. Conversion from one format to another is common and the invention is compatible with any type of file. This disclosure is not intended to be limited to use with any particular file format.

Figure 4:
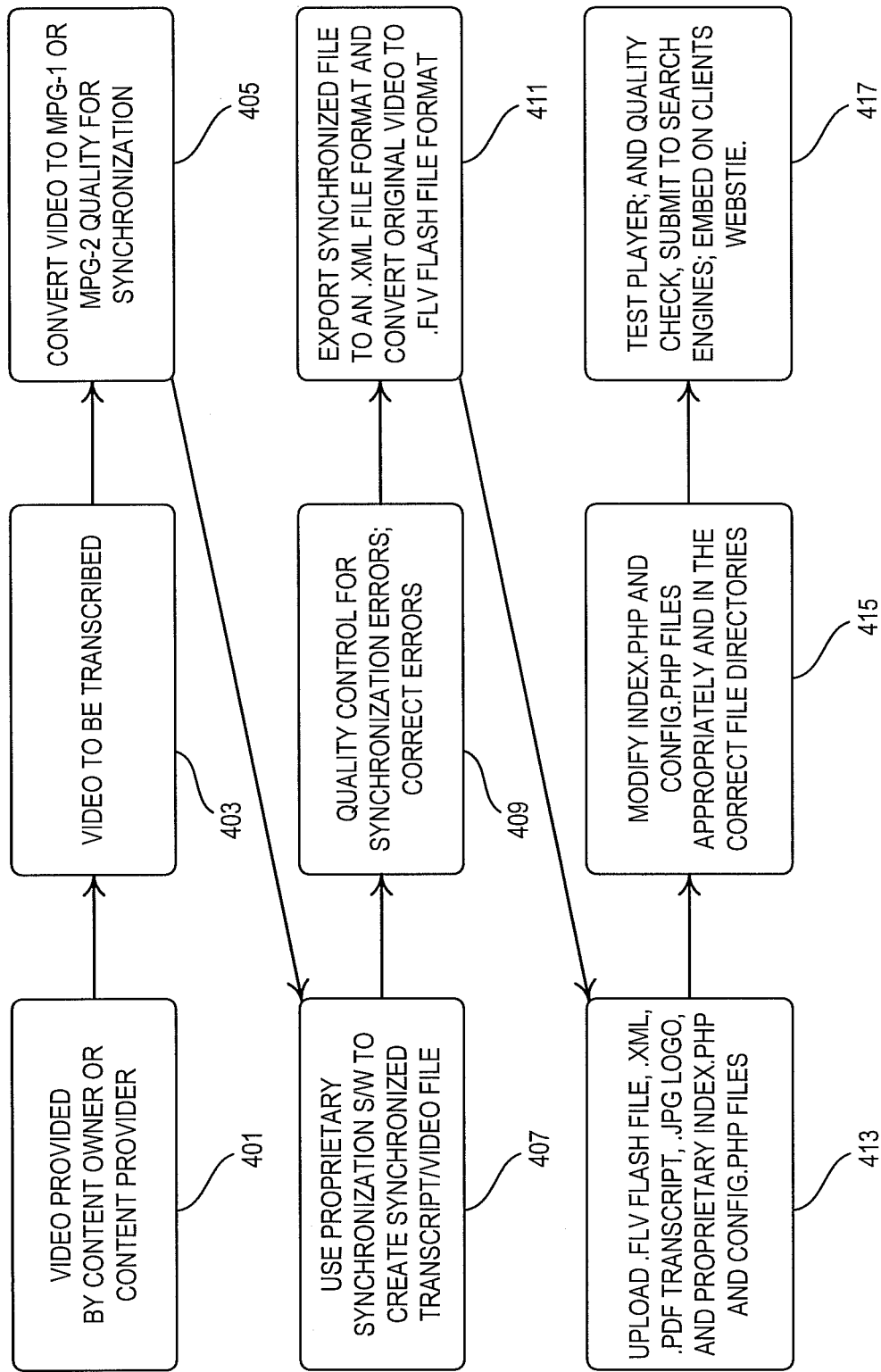
FIG. 4 is a flow chart of a sample embodiment of a media player process in accordance with the present invention.

FIG. 4 illustrates a representative process for displaying media content in accordance with the present invention. Audio or video content is provided at step 401. To maximize the efficiency and accuracy of a search, it is preferable for the audio content to be accurately transcribed in step 403. If necessary, the audio or video is converted to a video format compatible with the specific synchronization software being used (such as TimeCoder Pro by InData Corp. of Gilbert, Ariz.) at step 405. Using the accurate transcript and the video file, the synchronization software is used to produce a time-coded, (and captioning-friendly) text file at step 407. The text file is then checked for accuracy and synchronization at step 409 against the video. Following the correction of errors, if any, the file is then exported to an .XML file at step 411. The .XML file contains the text and the time codes which correspond to elapsed time in the video. The video is then converted to the final video format required by the media player (in this case, a standard .FLV web-based flash file format) also at step 411. The video is then uploaded to the video server at step 413. The .XML file (as well as any supporting files that customize the look of the player, that display the transcript or the client logo, etc) are uploaded to any web site at step 413, along with the index.php and config.php files. The proprietary index.php and config.php files are modified to point to the correct directories and corresponding files at step 415. An example of the modification of the config.php file is as follows:

```
$config['videos'][4]['video_title'] = "David Gallo-
Underwater Astonishments";
$config['videos'][4]['video_url'] = "rtmp:/vod/DavidGallo2007.flv";
$config['videos'][4]['xml_file'] =
    "http://72.167.41.166/newclient/ted/davidgallo/DG042609.xml";
$config['videos'][4]['pdf_download'] =
    "http://72.167.41.166/newclient/ted/davidgallo/Underwater.pdf";
$config['videos'][4]['client_logo'] =
    "http://72.167.41.166/newclient/ted/davidgallo/RTIlogo.jpg";
```

The index.php and config.php files cross reference one another and determine the design layout of the web site, as discussed below. In this particular process, the final steps are to clear the cache and test the player on different web browsers, submit to search engines and/or make sure the web site containing the video content gets indexed frequently at step 417. (Further illustrated and explained in FIG. 5, below.)

Figure 5:
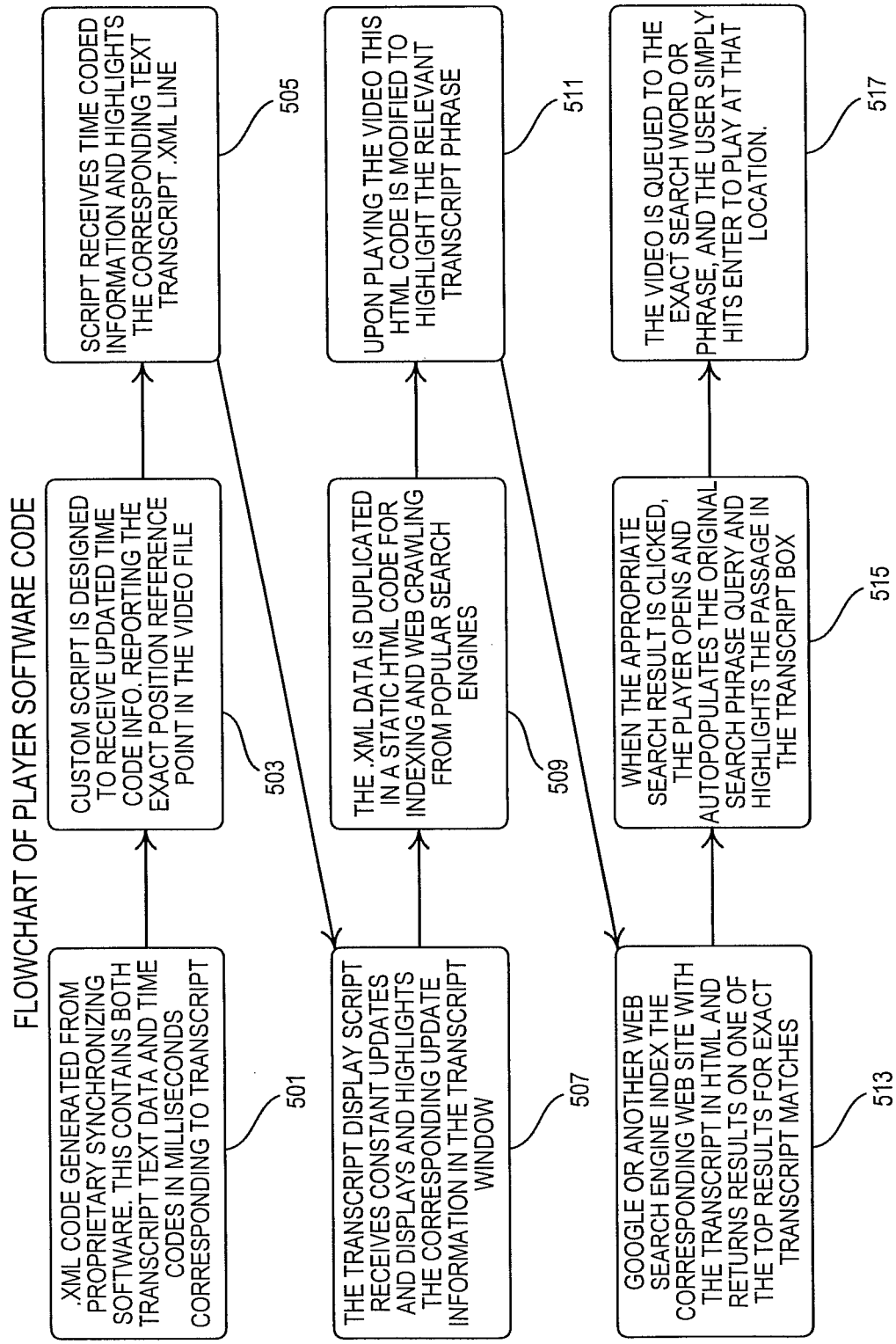
FIG. 5 is a flow chart of a sample embodiment of media player software code in accordance with the present invention.

The flowchart of the player scripting process is shown in FIG. 5. Once the output of the .XML code is generated at step 501, the index.php and config.php scripting process are designed to receive updated time code information reporting to the exact position reference point in the content file at step 503. This highlights, bolds, italicizes or in some other way indicates to the user the searched text string in the corresponding text transcription display window 321 adjacent to the player in Javascript at step 505. This process is repeated as the player is advanced line by line in the .XML code at step 507. The script additionally duplicates the .XML data via a static HTML code that is necessary for indexing and web crawling by popular search engines (e.g. Google, Bing and others) at step 509. While playing the content, the HTML code is modified to highlight the passage of the relevant transcript phrase at step 511. Google or other Web search engines are by nature designed to crawl and index web sites that contain this static HTML code at step 513. Once the search engine indexes the page, the results are displayed for SEO (Search Engine Optimization) purposes at step 513. The results are designed to bring the user to the player within one click of the mouse, efficiently and seamlessly with the search query phrase auto-populated and ready to play at that reference point at step 515 and 517 respectively.

The .XML, JavaScript and flash .FLV files are uniquely used together during playback in the following manner: As the content plays, a time-coded update is sent to the external script, reporting its exact position in a progress bar that is the same or having similar function to progress bar 317 shown in FIG. 3d. The script receives this time-coded information and highlights or displays the transcript text content in the .XML file that corresponds with the synchronized time code in the content. (Note: The .XML file contains both the transcript text and the time-coded information). A sample of the .XML file is as follows:

```
<TimeMs>18780</TimeMs>
<PageNo>1</PageNo>
    <LineNo>1</LineNo>
        <QA>-</QA>
    <Text>We are going to go on a dive to the deep sea,</Text>
    </Line>
        <Line ID="1">
<Stream>0</Stream>
<TimeMs>22340</TimeMs>
<PageNo>1</PageNo>
<LineNo>2</LineNo>
<QA>-</QA>
    <Text>and anyone that's had that lovely opportunity</Text>
</Line>
        <Line ID="2">
<Stream>0</Stream>
```

Upon the content playing, the transcript display script will receive constant updates and will show each .XML content value that exactly corresponds to the content as it is playing. Before the content is played, the complete transcript is additionally listed in static HTML to facilitate search engine crawling/indexing for SEO purposes. Upon playing the content or searching the transcript, this HTML code is modified to highlight or otherwise indicate the relevant phrase to the user. This static HTML is modified with industry standard coding in JavaScript. Upon a user clicking on a selected link in a list of search results 305, the player page will load, pull the key phrases from the search query box 303 using techniques understood by and commonly known to those of ordinary skill in the art, and automatically perform an internal search on the transcript for this same search string, and then list the search results at the top of the page (each are linked to the appropriate starting point within the media player.) The complete transcript will still be shown in the transcription display window 321 below this box with the search string populated and indicated to the user. Hitting the ENTER or TAB key or clicking on one of the search strings will take the user to the exact point in the content that is found by the search string. Once the content is opened in the media player, the user can easily search content using the features described with respect to FIGS. 3a-3d above and further explained with respect to the help page of FIG. 3d.

The $_SERVER['HTTP_REFERRER'] variable is used by developers for many different reasons and applications. In the current invention, it is used to search for audio, video and audio-video content to be easily browsed by providing the content as generic, textual search data that can be consumed by any third-party search utility that operates by searching text. (e.g. Google, Bing, etc.). Or, as a means to detect what the user searched for in the third-party search tool, and to automatically queue the resulting content to best match that information.

One example of how this is accomplished is as follows:
a) A content file with embedded timeline information is provided in .FLV. A textual transcript of the video/audio content is provided with time-markers embedded in the transcript that indicates the corresponding part of the content file in XML.

b) The transcript and content file are programmed such that the text is linked to the specific point in the timeline that corresponds with that transcript. An example of this is in FIG. 3c showing the XML file contents and in the XML sample shown above. The time in milliseconds is shown in the first line of the XML file above as 18780 or 18.780 seconds (also see Appendix A), and that time is from the start point of the content file. This additionally can be referenced as page and line numbers as described with respect to FIG. 5 above.

c) The complete transcript is displayed as plain HTML text so as to be picked up by search engines and other third-party search indexing tools.

d) Once the transcript has been indexed by the third-party search tool (e.g. Google, Bing, etc.), using HTML, which search engines are set to crawl automatically and index, it is included in search results such as search results 305 in FIG. 3b.

e) By default, when the user is on the results page (FIG. 3b), the URL of the results page reflects the search they just performed, as in the above example:

http://www.google.com/search?hl=en&q=Dr.+Edith+Widder%2C+she+is+now+at+the+Ocean+Research+%26+Conservation+Association%2C+was+able+to+come+up+with+a+camera+that+could+capture+some+of+these+incredible+animals&cad=h f) When a user clicks on the results link, they are taken into the media player.

g) The system reads a server environment variable for that request that tells the system the URL from where the user came. (Ex: In a PHP file, this value is retrieved with the Javascript command $ SERVER['HTTP REFERER'] variable contains this data). In the case of the above search image, this value would be as follows (the URL of the search string, the "referring" page):

http://www.google.com/search?hl=en&q=Dr.+Edith+Widder%2C+she+is+now+at+the+Ocean+Research+%26+Conservation+Association%2C+was+able+to+come+up+with+a+camera+that+could+capture+some+of+these+incredible+animals&cad=h h) This value is parsed for the search query that the user typed into the search engine. In this example, it was: "Dr. Edith Widder, she is now at the Ocean Research & Conservation Association, was able to come up with a camera that could capture some of these incredible animals"

i) A secondary query is then automatically performed on the transcript for the presence of this search string. Before the system loads to the user, this search on the transcript is performed, and the user is presented with the content with a search already performed on the transcript. The parts of the transcript that were found during this secondary search are then provided prominently by, for example, auto-populating in the search window 313 using highlighting, underlining, bolding, italics and/or close captioning 315 over all other results. They allow for the user to click on them and be taken to the precise location in the video/audio where this searched-for string appears as displayed in transcription display window 321.

Appendix A attached hereto and incorporated by reference herein shows a typical page source html code listing from a sample synchronized video transcript.

Figure 6:
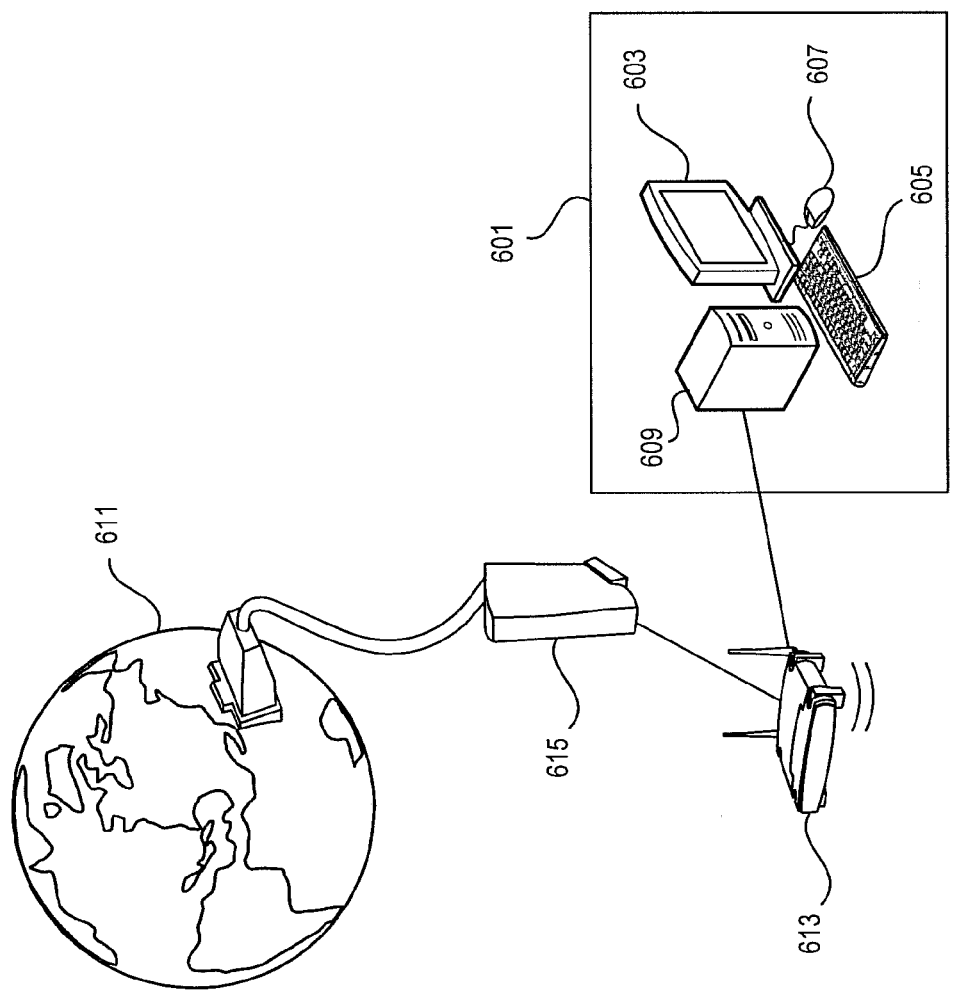
FIG. 6 is a block diagram of a computer system and network of the present invention connected to permit a user to perform searches and review media results of audio, video and/or A-V content.

FIG. 6 is a simple block diagram of a system, including a networked home computer 601, on which the invention may be implemented. Home computer 601 is shown having a screen 603, a keyboard 605, a mouse 607 and a central processing unit ("CPU") 609. Home computer 601 is connected to a network 611 through a USB port (not shown), a wireless connection using a wireless router 613 or any of a number of other connector ports that are typically used on computers to connect them to outside networks either directly or through a service provider using cable, satellite, phone or other service lines 615 coming into the user location. The connection to network 611 permits home computer 601 to have access to the internet or another network where a user can conduct searches as described throughout this disclosure. It will be understood that other types of devices with search capabilities can be substituted for home computer 601 as identified herein.

Home computer 601 is capable of executing software applications including search and media players as described herein. Such applications are executed on home computer 601 and may reside locally on home computer 601 or at a remote location on network 611.

It is to be understood that the above descriptions and drawings are only for illustrating representative variations of the present invention and are not intended to limit the scope thereof. Any variation and derivation from the above description and drawings are included in the scope of the present invention. For example, while a linear progress bar 209b has been shown in the figures, there are many different ways to represent the progress of the audio-video content as it is played. A circular depiction could be shown instead or any other visual technique for letting a user know the current position within the audio or A-V track relative to beginning and/or end point(s).

What is claimed is:

1. A method of conducting a search on an electronic device having a display, a central processing unit ("CPU") that is configured with a media player and at least one user interface, the method being used for finding and displaying results including content that is text, audio, video and/or audio-video, comprising:

(a) inputting a search string of text on the electronic device using the at least one user interface;

(b) performing a search by the CPU using the search string on content accessible to the electronic device wherein the content comprises (i) text-based content, (ii) audio-based content, (iii) video-based content, and/or (iv) audio-video based content;

(c) finding search results using the CPU wherein each of the search results includes the search string or a string of text similar to the search string in the content and wherein the content includes either: (i) text-based content with the search string or a string of text similar to the search string; or (ii) audio-based content, video-based content or audio-video based content where the content includes the search string or a string of text similar to the search string;

(d) providing a list of the search results to the user on the display of the electronic device;

(e) inputting a command on the at least one user interface to the CPU of the electronic device to select a result from the list that has content that is not text;

(f) opening a media player by the CPU on the display of the electronic device to play one of: (i) audio content, (ii) video content, or (iii) audio-video content, upon a particular search result having content being selected by the user from the list of search results, the media player being automatically opened, auto-populated with the content selected by the user, and queued to begin play at a start of an occurrence of the search string or a string of text similar to the search string.

2. The method of claim 1 further comprising showing a marker for at least one location of the search text or a string of text similar to the search string on an indicator at a point in the content corresponding to an occurrence of the search string or a string of text similar to the search string.

3. The method of claim 1 further comprising indicating an occurrence of the search string or a string of text similar to the search string at each location where the search string or a string of text similar to the search string appears in a transcript of text of the content.

4. The method of claim 1 wherein the content is queued to begin play at an occurrence of the search string or a string of text similar to the search string.

5. The method of claim 3 wherein the search string or a string of text similar to the search string is indicated to a user by one or more of the following: a) highlighting the text; b) italicizing the text; c) underlining the text; d) coloring the text; e) changing the font or size of the text; and/or f) bolding the text.

6. The method of claim 1 wherein upon opening a search result of content, the media player is auto-populated with a textual transcript synchronized to the content with the content queued to the start of an occurrence of the search string or a string of text similar to the search string.

7. The method of claim 1 wherein the content includes a record of words that may be specified in a textual transcript and is a type from the group comprising: (i) audio content including words that are presented through speech, including but not limited to words that are spoken or sung; (ii) video content including sign language or other visual cues that have defined meaning, including but not limited to American Sign Language; (iii) supplemental text; or (iv) visual images of a recognizable person, place or thing that may be described or represented by text.

8. The method of claim 1 wherein the electronic device is connected to a network, and further wherein the search is performed on content on the network.

9. A device for searching content to find and display results comprising:
   (a) a central processing unit ("CPU");
   (b) a display connected to the CPU for displaying information;
   (c) at least one user interface connected to the CPU for inputting instructions to the CPU, including inputting a search string of text;
   (d) a communications port connected to the CPU through which a source of content is accessible by the CPU over a network to which the device is connected, the content comprising (i) text-based content, (ii) audio-based content, (iii) video-based content, and/or (iv) audio-video based content;
   (e) a search application operable on the device by a user through the at least one user interface that is executed by the CPU to search for the search string or a string of text similar to the search string embedded in the content and to present search results of content on the display, wherein the content in each of the search results includes either: (i) text-based content with the search string or a string of text similar to the search string; or (ii) audio-based content, video-based content or audio-video based content where the content includes the search string or a string of text similar to the search string; and
   (f) a media player application operable on the device by a user through the user interface that is executed by the CPU upon selection of content that is not text based to play one of: (i) audio-based content, (ii) video-based content, or (iii) audio-video based content, upon a particular search result having content being selected by the user from the list of search results, the media player being automatically opened, auto-populated with the content selected by the user, and queued to begin play at a start of an occurrence of the search string or a string of text similar to the search string.

10. The system of claim 9 wherein the search string or a string of text similar to the search string is indexed to at least one location on a progress indicator with a marker at a point in the content corresponding to an occurrence of the search text string or a string of text similar to the search string.

11. The system of claim 9 wherein a textual transcript of the content is displayed with the search string or a string of text similar to the search string indicated to a user at each occurrence in the textual transcript.

12. The system of claim 9 wherein the content is queued to begin play at an occurrence of the search string or a string of text similar to the search string.

13. The system of claim 11 wherein the search string or a string of text similar to the search string is indicated to a user on the display by one or more of the following: a) highlighting the text; b) italicizing the text; c) underlining the text; d) coloring the text; e) changing the font or size of the text; and/or f) bolding the text.

14. The system of claim 11 wherein upon opening a search result of content, the media player is auto-populated with a textual transcript synchronized to the content with the content queued to a start of an occurrence of the search string or a string of text similar to the search string.

15. The system of claim 11 wherein the content includes a record of words that may be specified in a textual transcript and is a type from the group comprising: (i) audio content including words that are presented through speech, including but not limited to words that are spoken or sung; (ii) video content including sign language or other visual cues that have defined meaning, including but to limited to American Sign Language; (iii) supplemental text; or (iv) visual images of a recognizable person, place or thing that may be described or represented by text.

16. The device of claim 9 wherein the device is connected to a network, and further wherein the search is performed on content on the network.

\* \* \* \* \*